Aug. 11, 1925.
S. J. WALLACE
LOCK
Filed May 9, 1924
1,549,638
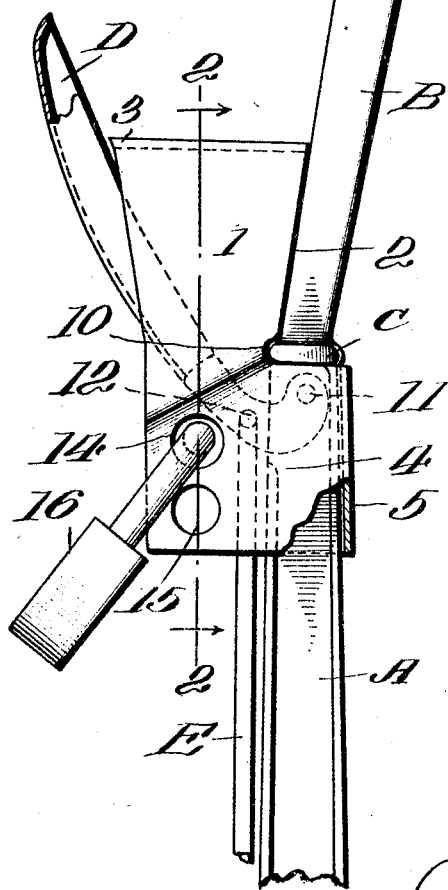
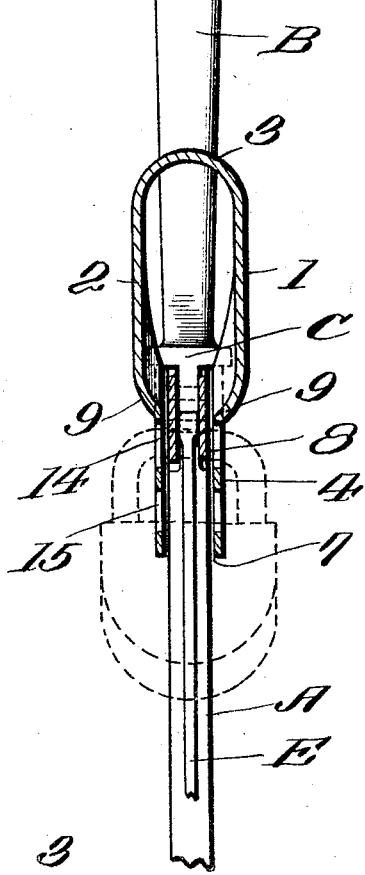
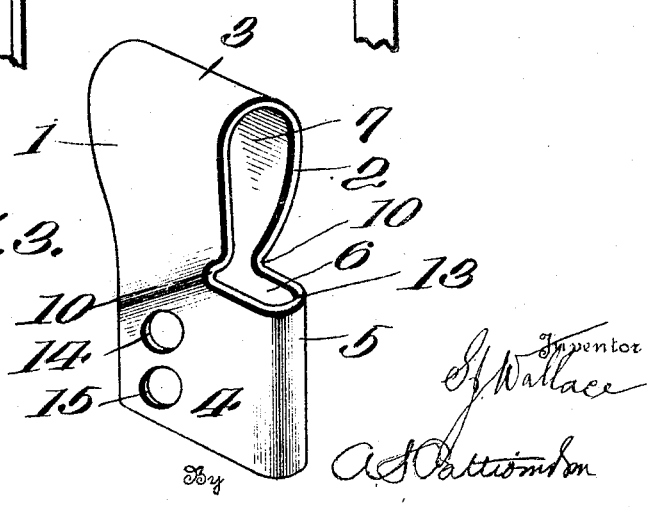

Patented Aug. 11, 1925.

1,549,638

UNITED STATES PATENT OFFICE.

SAMUEL J. WALLACE, OF FORT WORTH, TEXAS.

LOCK.

Application filed May 9, 1924. Serial No. 712,040.

*To all whom it may concern:*

Be it known that I, SAMUEL J. WALLACE, a citizen of the United States, residing at Forth Worth, in the county of Tarrant and State of Texas, have invented certain new and useful Improvements in Locks, of which the following is a specification, reference being had therein to the accompanying drawing.

This invention relates to improvements in locks and more particularly to a lock for preventing the operation of the emergency brake of automobiles.

The primary object of the invention is to provide a lock for use on the emergency brakes of automobiles to prevent the unauthorized operation and release of the brake.

Another further object is to provide a locking device adapted to be secured in a manner to prevent the operation of the release lever of an automobile emergency brake.

Another and further object of the invention is to provide a locking device to be employed in connection with the releasing lever of an emergency brake or the like which will lock and hold the release lever of the brake against movement and thereby prevent the unauthorized operation of the emergency brake.

Another and further object of the invention is to provide a device of the character described which is cheap and simple of manufacture, highly efficient in operation and simple and quick of application.

Other further objects, novel features of construction and improved results of the invention will appear in the following description and accompanying drawings.

In the drawings:

Figure 1 is a view in elevation of the upper end of an emergency brake carrying a control lever for releasing the brake, the brake having applied thereto my improved lock.

Figure 2 is a view in vertical section taken on the line 2—2 of Figure 1 looking in the direction indicated by arrow.

Figure 3 is a detail view in perspective of my improved locking device.

The drawings illustrate the preferred embodiment of my invention but I desire it to be understood that mechanical changes can be made in respect to my improved lock without departing from the spirit or scope of my invention.

In the drawings like parts are designated by similar reference numerals throughout the description, A representing the emergency brake lever which is provided at its upper end with a hand hold B at the bottom of which adjacent the point where it joins the emergency brake lever is an enlargement or flange C. A release lever D is carried by the emergency brake lever and is provided with a rod E whereby the release lever serves to release the well known type of latch common to emergency brakes.

The emergency brake construction described is that common to the well known Ford automobile although the emergency brakes of many other types and makes of automobiles are very similar of construction to the one just described and my improved lock is therefore applicable to emergency brakes upon many makes of automobiles by varying to a slight degree the dimensions of its parts.

As is well known on the type of car mentioned the emergency brake is moved in one direction for applying the emergency brake and simultaneously throwing the clutch in a neutral position in respect to the driving or transmission gears of the car. When the emergency brake is moved in the opposite direction the brake is released and simultaneously allows the clutch and the driving gears to operate and put the car into the high speed driving gears. It will therefore be readily apparent that the use of my improved lock upon a car of this type serves the two fold purpose of locking the car with the emergency brake on and locking the driving means against being thrown into gear.

On makes of cars wherein the emergency brake does not act in any manner upon the clutch or driving gears of the car my improved device will lock the emergency brake against release and therefore prevent the unlawful and unauthorized operation or release of the emergency brake and further prevent the theft of the car. The lock consists of vertical legs 1 and 2 which are in separated relation being closed at their upper ends by a top 3. The lower ends of the legs carry a U-shaped housing 4 the front end of the housing being in approximate vertical alignment with the front edges of the vertical walls while the housing extends rearwardly beyond the rear edges of the vertical walls having a closed rear end 5. The rearwardly extending end of the housing is open at its top as at 6. The entire bottom of the housing is open as at 7 and the entire front of the housing is open as designated at 8, the open front of the housing running into and joining the opening between the vertical walls 1 and 2. Due to the spaced relation of the walls 1 and 2 there is an opening 7 at their other rear edges, as clearly appears in Figure 3 of the drawing, this opening being above and in communication with the open top 6 of the rearwardly extending portion of the U shaped housing 4.

From the foregoing it will be seen that my locking device in vertical section is U-shaped as clearly appears in Figure 2 of the drawing and that the housing 4 is likewise of a U-shape. In the case of the entire device the U is standing vertically upon its legs while in the case of the housing the U is in a horizontal position. It will thus be seen that my improved lock comprises a vertical U-shaped portion 1, and a horizontal U-shaped portion 4, the lower end of the U-shaped portion 1 joined with the ends of the U-shaped portion 4.

By referring to Figure 2 of the drawings it will be readily apparent that the walls of the housing 4 are not separated as great a distance from one another as are the vertical legs 1 and 2, this being due to the fact that the vertical walls 1 and 2 are bent inwardly at 9 adjacent the point where they meet the top of the housing.

At the point of meeting of the rear edges of the vertical legs 1 and 2 with the upper edges of the rearwardly extending portion of the housing 4, I have provided the rear edges of the walls with cut out portions 10, the purpose of which will be hereinafter pointed out.

As is common, in the construction of emergency brakes the releasing lever D is pivotally mounted upon the brake lever A as at 11 while the latch releasing rod E is suitably fastened at 12 to the releasing lever.

In applying my improved lock to the emergency brake of an automobile the handle portion B of the brake rod A is inserted through the opening 7 of the lock and the lock is then pushed or swung downwardly into the position shown in Figures 1 and 2 of the drawing.

With the lock in the position shown in these figures the handle B of the brake rod is extending through the opening 7 while the upper edge 13 of the rearwardly extending portion of the housing 4 is below and abuts the large portion or flange C of the brake rod. A portion of the flange or enlargement C extends into the cut out portion 10 before mentioned. The release lever D is extending outwardly through the open front of the lock as clearly appears in Fig. 1 of the drawing.

Suitably positioned adjacent the front edges of the housing 4 are openings 14 and 15. The uppermost opening is positioned to be below the release lever D. Any suitable form of pad lock 16 or the like is inserted through the opening 14.

From the foregoing it will be seen that due to the pad lock 16 and the engagement of the housing 4 of the lock with the flanged portion C of the brake rod the lock can not be removed. It will be further readily understood that the release lever D can not be operated to release the usual catch through the medium of the rod E for the reason that the release lever D will engage the top 3 of the lock which will prevent its movement.

If it has not been readily apparent I wish to point out that with the emergency brake and its cooperating parts as shown in Figure 1 the emergency brake is what is termed as "on". When the emergency brake is "on" the handle B of the emergency brake rod and the releasing handle D are in separated relation. It is in the space between these members that the vertical legs of the lock are positioned, the front end of the top 3 engaging the release lever while the rear end of the top is engaging the handle B, thus preventing all movement of the releasing lever and thereby securely locking the emergencey brake in its "on" or set position and in the case of a Ford automobile locking the car against movement through the driving or transmission gears.

From the foregoing description it will be obvious that a lock constructed in accordance with my invention is simple and cheap of manufacture and is well adapted to its use by reason of the fact that it is convenient and rapid of application to the emergency brake.

As heretofore pointed out my improved lock can be applied to cars of different makes with very slight changes or modifications in its dimensions. In its use upon certain automobiles it might be necessary to insert the pad lock 16 through the lower opening 15. In using my lock upon some cars it might be even necessary to change the entire positioning of the openings for receiving the pad lock, but such a slight mechanical change would be obvious.

In the case of a Ford automobile it will be understood that when the car is parked the emergency brake is applied, thereby locking the car and simultaneously throwing the engine out of gear with the rear wheels of the machine. Upon the application of my improved locking device it will be impossible to start the engine either by towing or pushing the car and additionally both rear wheels are locked by the emergency brake lever. The locking of the car by the use of my improved lock can be done as quickly and easily as using the usual form of starter key in respect to the ignition of the machine. Additionally my lock is very small and is of light weight and can be easily and readily carried in the pocket of the automobile driver.

Having thus described my invention what I claim and desire to secure by Letters Patent is:

1. A lock of the character described, comprising vertical parallel portions joined at their upper ends, and horizontal parallel portions joined at their outer ends, the said portions adapted to be applied as described, and locking means passing through the parallel portions.

2. A lock of the type described, comprising a vertical U-shaped part, a lower horizontal U-shaped part, the said parts having their parallel portions joined, and a locking member for the parallel portions of the horizontal U-shaped member.

3. A lock of the character described, comprising a depending vertical U-shaped portion and a horizontal U-shaped portion located at the lower end of the vertical U-shaped portion and joined therewith, the said lock applied to a brake rod and releasing lever as defined, the horizontal U-shaped portion having a transverse opening at a point below the releasing lever, and a lock passing through the said opening.

4. A lock of the character described, comprising a depending vertical U-shaped portion, a horizontal U-shaped portion connected at the lower end of the vertical portion and at one side thereof constituting an L-shaped portion, the said lock adapted to be applied in the manner described to a brake rod having a releasing lever, the horizontal U-shaped portion having a transverse opening located below the releasing lever, and a lock passing through the said opening.

In testimony whereof I hereunto affix my signature.

SAMUEL J. WALLACE.